(12) United States Patent
Yamagishi et al.

(10) Patent No.: US 9,579,813 B2
(45) Date of Patent: Feb. 28, 2017

(54) CUTTING APPARATUS

(75) Inventors: Hidenobu Yamagishi, Tokyo (JP);
Takahiro Niwa, Tokyo (JP); Masaki Yoshihara, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 616 days.

(21) Appl. No.: 14/110,657

(22) PCT Filed: Apr. 9, 2012

(86) PCT No.: PCT/JP2012/059677
§ 371 (c)(1),
(2), (4) Date: Nov. 20, 2013

(87) PCT Pub. No.: WO2012/141132
PCT Pub. Date: Oct. 18, 2012

(65) Prior Publication Data
US 2014/0076116 A1   Mar. 20, 2014

(30) Foreign Application Priority Data

Apr. 14, 2011   (JP) .................................. 2011-089766

(51) Int. Cl.
*B26D 3/16* (2006.01)
*B29C 49/42* (2006.01)
(Continued)

(52) U.S. Cl.
CPC ................. *B26D 3/16* (2013.01); *B26D 3/166* (2013.01); *B29C 49/4273* (2013.01); *B26D 1/09* (2013.01);
(Continued)

(58) Field of Classification Search
CPC ............. B26D 3/16; B26D 3/166; B26D 7/01; B26D 1/09; B26F 2210/06
(Continued)

(56) References Cited

U.S. PATENT DOCUMENTS 1,054,387 A * 2/1913 Bennette ................ B23Q 11/08
82/152
1,687,872 A * 10/1928 Maynard ................ B29D 23/24
144/241
(Continued)

FOREIGN PATENT DOCUMENTS

DK   WO 2012055822 A1 * 5/2012 ............... B26D 3/02
JP       60-127998 A     7/1985
(Continued)

OTHER PUBLICATIONS

Extended European Search Report dated Nov. 17, 2014, issued in corresponding European Patent Application No. 12770846.9.
(Continued)

*Primary Examiner* — Sara Addisu
(74) *Attorney, Agent, or Firm* — Westerman, Hattori, Daniels & Adrian, LLP

(57) ABSTRACT

Provided is a cutting apparatus 10 including a workpiece fixing jig 2 that supports a workpiece 1, rotates by operation of rotary drive means 3, and rotates the workpiece 1 while fixing the workpiece 1; rotary drive means 3 for driving and rotating the workpiece fixing jig 2; support means 4a to 4c for supporting the workpiece 1 while rotating along with rotation of the workpiece fixing jig 2; cutter knives 5a and 5b that cut the rotating workpiece 1 at least at axially opposite ends of the workpiece 1; and slide moving means 6 for slidably moving the cutter knives. The cutting apparatus 10 having a simple apparatus configuration does not produce chips as a result of cutting with small variations in size and with high planarity of cut surfaces.

6 Claims, 6 Drawing Sheets

(51) Int. Cl.
  *B26D 7/01* (2006.01)
  *B26D 1/09* (2006.01)
(52) U.S. Cl.
  CPC ........... *B26D 7/01* (2013.01); *B26D 2007/013* (2013.01); *B26F 2210/06* (2013.01); *B29C 2793/009* (2013.01); *Y10T 82/16967* (2015.01)
(58) Field of Classification Search
  USPC ..................................................... 82/46, 101
  See application file for complete search history.

(56) References Cited

U.S. PATENT DOCUMENTS

| | | | | |
|---|---|---|---|---|
| 3,933,090 | A | * | 1/1976 | Reynolds ................. B23B 5/14 101/40.1 |
| 4,430,913 | A | * | 2/1984 | Williamson ............ B23B 5/163 82/59 |
| 6,418,822 | B1 | * | 7/2002 | Case ...................... B26D 3/163 82/113 |
| 6,564,861 | B1 | | 5/2003 | Miyazaki et al. |
| 2005/0005847 | A1 | | 1/2005 | Hiroki |
| 2010/0031789 | A1 | * | 2/2010 | Lupke ................... B23D 21/04 82/72 |

FOREIGN PATENT DOCUMENTS

| | | |
|---|---|---|
| JP | 2001-077256 A | 3/2001 |
| JP | 2003-203963 A | 7/2003 |
| JP | 2006-159326 A | 6/2006 |
| JP | 2006-296015 A | 10/2006 |
| WO | 2004/014618 A1 | 2/2004 |

OTHER PUBLICATIONS

International Search Report of PCT/JP2012/059677, mailing date of May 29, 2012.

* cited by examiner

CUTTING APPARATUS

TECHNICAL FIELD

The present invention relates to a cutting apparatus for cutting, for example, a cut-off portion of a resin molded product after blow molding.

BACKGROUND ART

In recent years, in a variety of sensors and wirings of automobiles, corrugated tubes that cover them are used. As shown in FIG. 10, for example, a corrugated tube 100 that covers an oxygen sensor includes an intermediate-diameter cylindrical portion 101, a large-diameter cylindrical portion 102, and a bellows portion 103 located between the intermediate-diameter cylindrical portion 101 and the large-diameter cylindrical portion 102. The corrugated tube is lightweight, flexible, and resistant to heat, and thus can protect the oxygen sensor for a long time.

In production of a corrugated tube, as shown in FIG. 11, a straight tube is fused by heating means, and high-pressure air is blown into the inside of the tube, whereby the shape of a molding die is transferred. The corrugated tube thus has seal portions 201 and 202 at opposite ends for sealing the high-pressure air. Such seal portions 201 and 202 are unnecessary parts and therefore cut off. Specifically, the corrugated tube 1 has to be cut at two places a and b at axially opposite ends at right angles relative to an axial direction 203.

As a method of cutting a rubber molded product, a cutting apparatus has been known that has a function of rotating a cut target that is an elastic work placed thereon, and includes a fixing device body for placing the center of the cut target in alignment with the center of rotation, two or more fixing arms installed on the fixing device body, a contact detection sensor provided on the fixing arm for detecting contact on the fixing arm, and a movable cutter provided independently of the fixing device body (JP-A-2006-159326).

RELATED-ART DOCUMENT

Patent Document

Patent Document 1: JP-A-2006-159326 (claim 1)

SUMMARY OF THE INVENTION

Problems to be Solved by the Invention

The cutting apparatus disclosed in JP-A-2006-159326, however, has a problem in that the apparatus structure in which the contact detection sensor is installed on the fixing arm to grasp an elastic work and the apparatus structure in which a distance sensor is provided on a movable arm to expand or contract a cutting blade are both complicated. Moreover, the cutting blade is serrated and thus produces chips as a result of cutting, thereby requiring a chips removable process. In the case of a corrugated tube, cut surfaces produced by cutting at axially opposite ends with small variations in size and with high planarity are required because the fitness with a mating material to which the corrugated tube is attached largely affects the oxygen sensor-protecting performance that is the role of the corrugated tube. Accordingly, a cutting apparatus is desired that can cut the axially opposite ends of a corrugated tube that is a resin molded product so as to provide cut surfaces with small variations in size and with excellent planarity, without producing chips.

An object of the present invention is therefore to provide a cutting apparatus that does not produce chips as a result of cutting and provides cut surfaces with small variations in size and with excellent planarity, with a simple apparatus configuration.

Means for Solving the Problems

The inventors of the invention conducted extensive studies in such a situation. As a result, the inventors found that a cutting apparatus including a workpiece fixing jig that supports a workpiece, rotates by operation of rotary drive means, and rotates the workpiece while fixing the workpiece, rotary drive means for driving and rotating the workpiece fixing jig, support means for supporting the workpiece while rotating along with rotation of the workpiece fixing jig, a cutter knife that cuts the rotating workpiece at least at axially opposite ends of the workpiece, and slide moving means for slidably moving the cutter knife has a simple apparatus configuration but does not produce chips as a result of cutting when a longitudinal hollow resin molded product is cut, and provides cut surfaces with small variations in size and with excellent planarity. This finding has led to the completion of the invention.

Specifically, the present invention provides a cutting apparatus including a workpiece fixing jig that supports a workpiece, rotates by operation of rotary drive means, and rotates the workpiece while fixing the workpiece, rotary drive means for driving and rotating the workpiece fixing jig, support means for supporting the workpiece while rotating along with rotation of the workpiece fixing jig, a cutter knife that cuts the rotating workpiece at least at axially opposite ends of the workpiece, and slide moving means for slidably moving the cutter knife.

Effects of the Invention

According to the present invention, while the apparatus configuration is simple, when a longitudinal hollow resin molded product is cut, chips are not produced as a result of cutting, and cut surfaces having excellent planarity can be obtained.

DESCRIPTION OF EXEMPLARY EMBODIMENTS

Figure 1:
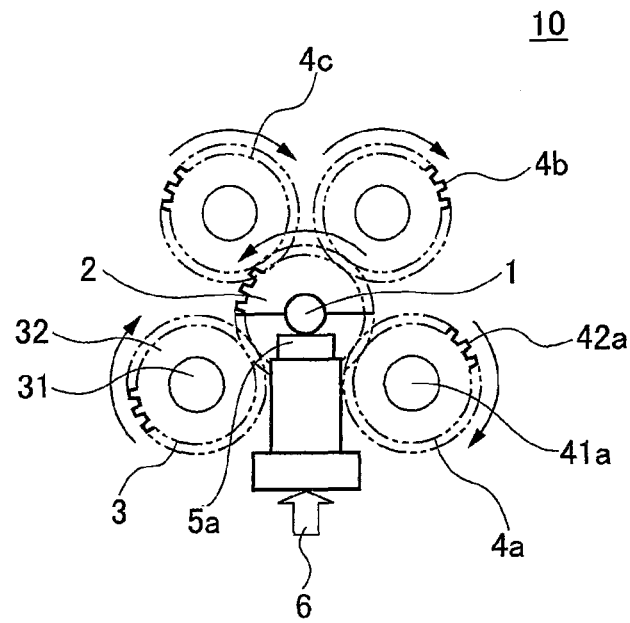
FIG. 1 is a left side view schematically showing a cutting apparatus in an embodiment of the present invention.

A cutting apparatus in an embodiment of the present invention will now be described with reference to FIGS. 1 to 11. The cutting apparatus 10 includes a workpiece fixing jig 2 that supports a workpiece 1, rotates by operation of rotary drive means 3, and rotates the workpiece 1 while fixing the workpiece 1, rotary drive means 3 for driving and rotating the workpiece fixing jig 2, support means 4a to 4c for supporting the workpiece 1 while rotating along with rotation of the workpiece fixing jig 2, cutter knives 5a and 5b that cut the rotating workpiece 1 at axially opposite ends a and b of the workpiece 1, and slide moving means 6 for slidably moving the cutter knives.

Figure 10:
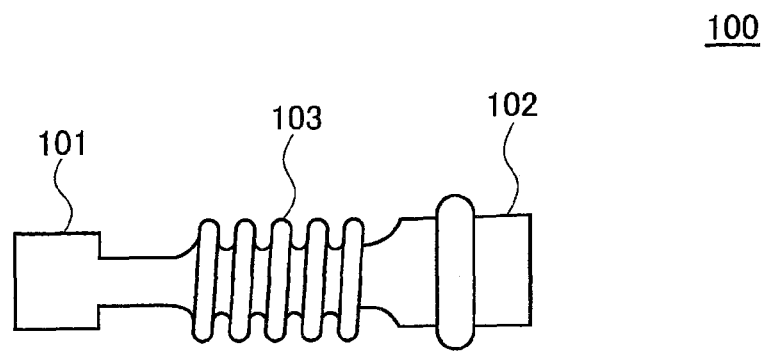
FIG. 10 is a cross-sectional view of a corrugated tube (product).

An example of a work product (product) cut out from the workpiece 1 is shown in FIG. 10. FIG. 10 shows a corrugated tube for covering an oxygen sensor as an automotive part. The corrugated tube includes an intermediate-diameter cylindrical portion 101, a large-diameter cylindrical portion 102, and a bellows portion 103 located between the intermediate-diameter cylindrical portion 101 and the large-diameter cylindrical portion 102. The corrugated tube is a hollow with an entire length of about 45 mm and is lightweight, highly flexible, and excellent in heat resistance and durability.

Figure 11:
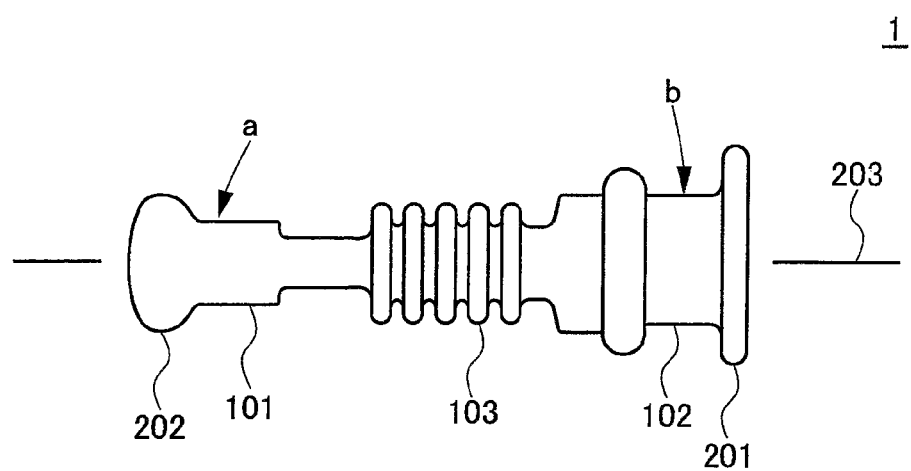
FIG. 11 is a cross-sectional view of a corrugated tube (workpiece).

In the present invention, the workpiece 1 that is an intermediate material of the product in FIG. 10 is a longitudinal hollow resin molded product, in particular, made of polytetrafluoroethylene (PTFE). The workpiece 1 is formed by fusing a straight tube by heating means and blowing high-pressure air into the inside of the tube thereby transferring the shape of a molding die and thus has seal portions 201 and 202 at opposite ends thereof for sealing the high-pressure air, as shown in FIG. 11. Such seal portions 201 and 202 are unnecessary parts and therefor cut off. In the present invention, the corrugated tube 1 as a workpiece is cut at two places a and b at axially opposite ends almost simultaneously, resulting in a work product 100 (product).

Figure 4:
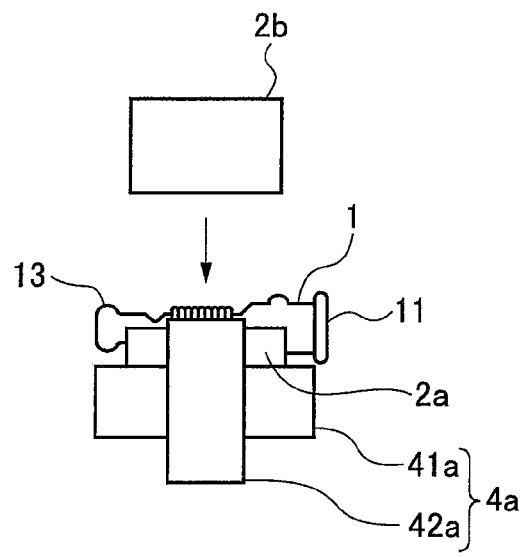
FIG. 4 is a right side view of FIG. 3.
Figure 5:
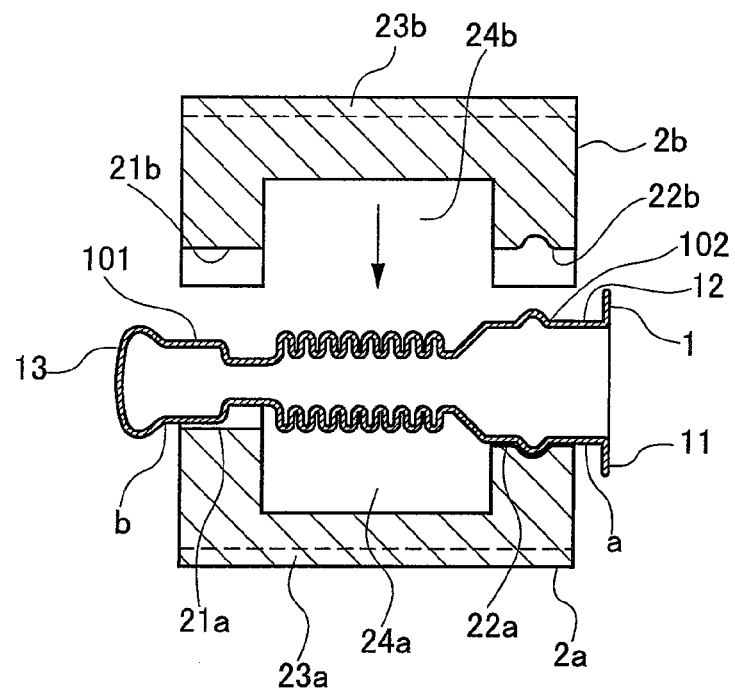
FIG. 5 is a cross-sectional view taken along a line X-X in FIG. 3.

The workpiece fixing jig 2 is not particularly limited as long as it rotates by operation of the rotary drive means 3 and rotates the workpiece 1 while fixing the workpiece 1. In this example, the workpiece fixing jig 2 holds the outer peripheral surface of the corrugated tube 1 as a workpiece, excluding the axially opposite ends a and b, between two half cylindrical members 2a and 2b from opposite sides (see FIGS. 3 and 4). As shown in FIG. 5, the half cylindrical members 2a and 2b have spaces 24a and 24b, respectively, in the inside for accommodating halves of the workpiece 1 in the diameter direction and have a number of meshed teeth 23a and 23b on the outer peripheral surface at a predetermined pitch in the circumferential direction. After assembly, the structure of the inner wall that forms the internal spaces 24a and 24b has first abutment portions 21a and 2 1b in abutment with the outer peripheral surface of the intermediate-diameter cylindrical portion 101 of workpiece 1 and second abutment portions 22a and 22b in abutment with the outer peripheral surface of the large-diameter cylindrical portion 102. That is, when the workpiece 1 is held between the two half cylindrical members 2a and 2b, the strength of contact between the workpiece 1 and the first abutment portions 21a and 21b and between the workpiece 1 and the second abutment portions 22a and 22b is so weak as not to deform the workpiece 1. In this way, even with small holding force, the workpiece 1 rotates without stopping along with the rotation of the workpiece fixing jig 2 and keeps rotating as well even when being cut, because the workpiece 1 is lightweight and has a small resistance to cutting by the cutter knives.

The two half cylindrical members 2a and 2b are provided with a positioning pin at their contact surface or have a mating structure thereby to be connected with each other without being displaced, so that they fix the workpiece 1 held therebetween and are fixed to each other.

The rotary drive means 3 is not particularly limited as long as it drives and rotates the workpiece fixing jig 2. In this example, the rotary drive means 3 is a pair of gears having meshed teeth 32 on the outer peripheral surface to mesh with the outer peripheral teeth of the workpiece fixing jig 2. A rotation shaft (gear shaft) 31 is coupled to a not-shown motor shaft. A pair of gears is formed at positions corresponding to the workpiece fixing jig 2. That is, the motor drives the gear 32 to rotate, so that the workpiece fixing jig 2 meshing with the teeth of the gear 32 is rotated.

The support means 4a to 4c are not particularly limited as long as they support the workpiece 1 while rotating along with rotation of the workpiece fixing jig 2. In this example, the support means 4a to 4c are three pairs of gears each having meshed teeth on the outer peripheral surface to mesh with the outer peripheral teeth of the workpiece fixing jig 2. That is, three rotation shafts and one rotation shaft of the rotary drive means 3, in total, four rotation shafts are positioned so as to hold the workpiece fixing jig 2 from four directions in the circumferential direction. Specifically, with the four shafts, the angle (as viewed from the side) formed by the adjacent shafts and the rotation shaft of the workpiece fixing jig 2 is approximately 90 degrees. It is noted that the angle (as viewed from the side) formed by the two adjacent rotation shafts that form a space into which the cutter knife 5 is inserted and the rotation shaft of the workpiece fixing jig 2 is greater than 90 degrees. The rotation shafts (gear shafts) of the support means 4a to 4c and the rotation shaft (gear shaft) of the rotary drive means 3 are arranged as described above thereby to stably support the workpiece fixing jig 2 and steadily rotate the workpiece fixing jig 2.

The cutter knife 5 (5a, 5b) cuts the rotating workpiece 1 at axially opposite ends of the workpiece 1. The cutter knife 5 therefore includes a first cutter knife 5a for cutting one axial end of the workpiece 1 and a second cutter knife 5b for cutting the other axial end of the workpiece 1. The first cutter knife 5a and the second cutter knife 5b are integrated on the base ends of the knives and are slidably moved integrally. That is, the first cutter knife 5a and the second cutter knife 5b have a length from a base end 51 that is adjusted in advance to be able to cut the workpiece 1 almost simultaneously.

A known cutter having a straight blade can be used as the cutter knife 5. The cutting angle of the cutter knife 5 relative to the workpiece 1 is preferably 10 to 25 degrees, and particularly preferably 15 degrees. The thickness of the blade of the cutter knife 5 is preferably 0.1 to 0.4 mm, particularly preferably 0.1 to 0.35 mm, and further preferably 0.2 to 0.33 mm. If the thickness of the blade is too large, variations in size tend to increase. The straight blade preferably has a height of 20 to 30 mm and a width of 35 to 45 mm. Examples of the material thereof include a steel plate or a stainless steel plate.

The slide moving means 6 is not particularly limited as long as it can slidably move the cutter knife 5. An example of the slide moving means 6 is an air cylinder. The air cylinder is connected to the cutter knife by connecting the base end 51 of the first cutter knife 5a and the second cutter knife 5b to the end of the piston cylinder or the piston rod of the air cylinder. Accordingly, the air cylinder can be operated to advance or retract the cutter knife 5 toward or from the workpiece 1.

An example of usage of the cutting apparatus 10 will now be described with reference to FIGS. 3 to 9. First, the cutting apparatus 10 is fixed by arranging one rotation shaft 31, the rotary drive means 3 having the gear 32 attached at a predetermined place in the axial direction of the rotation shaft 31, one rotation shaft 41a, the support means 4a having the gear 42a attached at a predetermined place in the axial direction of the rotation shaft 41a, at a predetermined distance. Here, the gear 32 of the rotary drive means 3 is positioned to be opposed to the gear 42a of the support means 4a. Next, the half fixing jig 2a (in the figure, the lower fixing jig) of the workpiece fixing jig 2 is set between the gear 32 of the rotary drive means 3 and the gear 42a of the support means 4a such that the teeth 23a of the gear of the half fixing jig 2a mesh with the teeth of the gear 32 and the gear 42a located on opposite sides.

Figure 3:
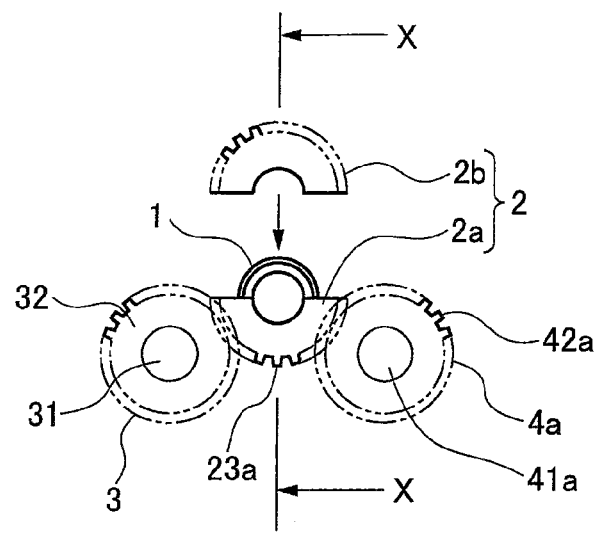
FIG. 3 is a view illustrating a method of setting a workpiece in the cutting apparatus in FIG. 1.

Next, the workpiece 1 is set in the half fixing jig 2a. Here, the outer peripheral surface of the intermediate-diameter cylindrical portion 101 of the workpiece 1 is brought into abutment with the first abutment portion 21a of the half fixing jig 2a, and the outer peripheral surface of the large-diameter cylindrical portion 102 is brought into abutment with the second abutment portion 22a of the half fixing jig 2a (FIGS. 3 and 4).

Figure 6:
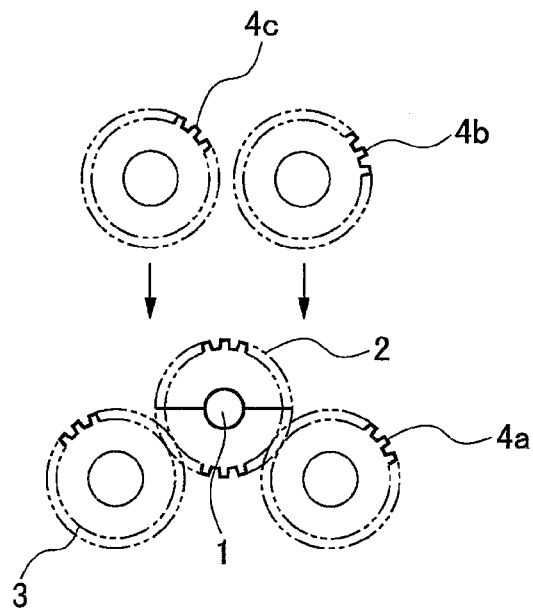
FIG. 6 illustrates a method of setting support means in the cutting apparatus in FIG. 1.

Next, the upper half fixing jig 2b is set from above the workpiece 1 placed in the half fixing jig 2a. Here, the outer peripheral surface of the intermediate-diameter cylindrical portion 101 of the workpiece 1 is brought into abutment with the first abutment portion 21b of the half fixing jig 2b, and the outer peripheral surface of the large-diameter cylindrical portion 102 is brought into abutment with the second abutment portion 22b of the half fixing jig 2b (FIG. 5). The lower half fixing jig 2a and the upper half fixing jig 2b are then fixed without being displaced, with a positioning pin arranged at their contact surface. As a result of the lower half fixing jig 2a and the upper half fixing jig 2b being fixed, the teeth of the gears thereof take a shape of continuous teeth at a predetermined pitch in the circumferential direction and constitute one gear in appearance (FIG. 6).

Figure 7:
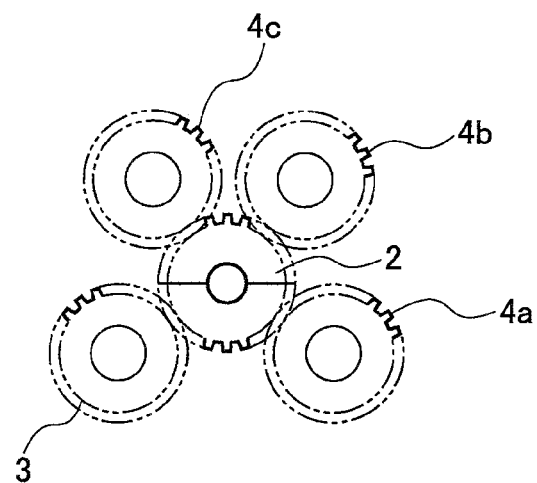
FIG. 7 is a view showing a state in which the support means is set in the cutting apparatus in FIG. 6.
Figure 8:
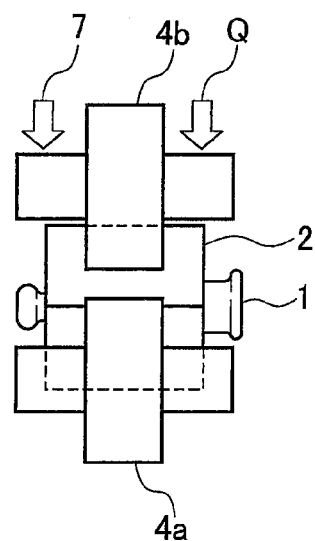
FIG. 8 is a front view of the cutting apparatus in FIG. 7.
Figure 9:
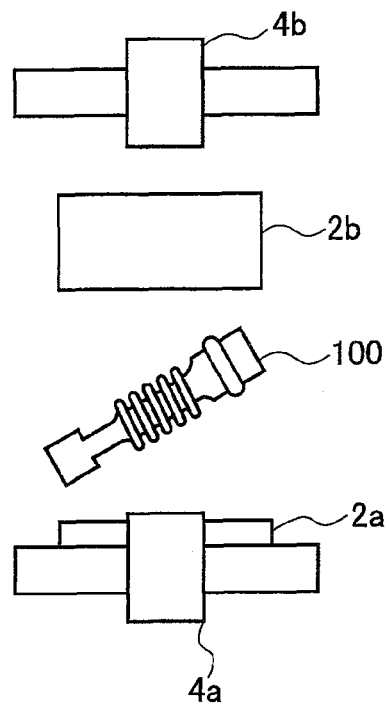
FIG. 9 is a view showing a state in which cutting is completed, and the support means and a workpiece fixing jib are removed to obtain a work product (product).

The two support means 4b and 4c of the support means 4 are then set to mesh with the meshed teeth 23b of the workpiece fixing jig 2 from above the workpiece fixing jig 2. That is, the two support means 4b and 4c are similar to another support means 4a, each having one rotation shaft and a gear attached at a predetermined place in the axial direction of the rotation shaft. The teeth of the gear attached at a predetermined place in the axial direction of the rotation shaft are meshed with the teeth 23b of the workpiece fixing jig 2. The two support means 4b and 4c of the support means 4 are driven by an air cylinder 7 to descend from above to below (the direction shown by a reference sign Q) (FIGS. 6 to 8). The two support means 4b and 4c descended downward by the air cylinder press the upper half fixing jig 2b toward the lower half fixing jig 2a, whereby the upper half fixing jig 2a and the lower half fixing jig 2b are joined with each other with such strong force that does not cause displacement even during rotating and driving. In this way, the workpiece 1 is fixed to the workpiece fixing jig 2 with weak holding force, and the workpiece fixing jig 2 is supported by one rotary drive means 3 and three support means 4a to 4c, in total, four gears, and is coupled thereto in a meshed state.

In this assembly, first, the rotary drive means 3 is driven. Then, the workpiece fixing jig 2 rotates in the direction opposite to that of one rotary drive means 3. In connection with the rotation of the workpiece fixing jig 2, three support means 4a to 4c rotate in the direction opposite to that of the workpiece fixing jig 2. The rotation of the workpiece fixing jig 2 causes the workpiece 1 to rotate in the same rotation direction and at the same rotation speed as the workpiece fixing jig 2. Since the workpiece 1 is a hollow resin molded product and is lightweight, the workpiece 1 rotates even with weak support force of the workpiece fixing jig 2 and is not deformed. The rotation speed in cutting the workpiece 1 is approximately 100 to 1000 rpm.

Figure 2:
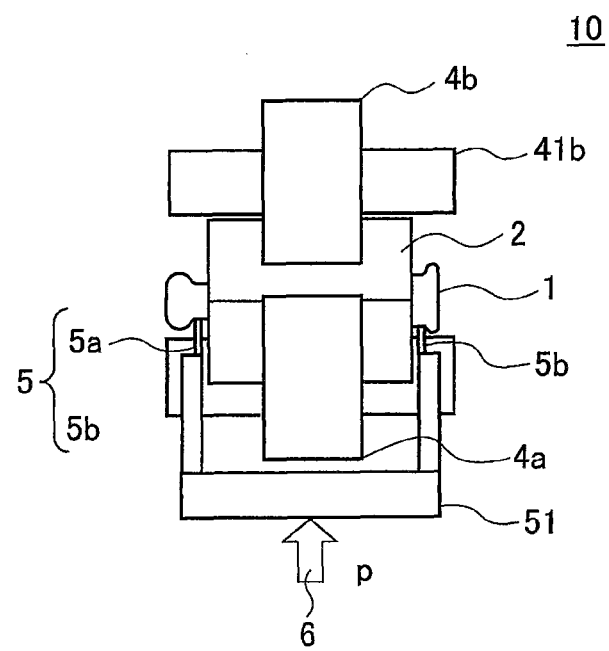
FIG. 2 is a front view schematically showing the cutting apparatus in the embodiment of the present invention.

Next, in the cutting apparatus 10, with the workpiece 1 being rotated, for example, the air cylinder 6 (slide moving means) coupled to the cutter knife 5 is operated to slidably move the cutter knife 5 in the direction toward the workpiece 1 (shown by a reference sign P). The edge of the cutter knife 5 comes into abutment with the workpiece 1 and is further slidably moved thereby to easily cut the workpiece 1 (FIGS. 1 and 2). Specifically, the first cutter knife 5a cuts one end 11 (boot cap) of the workpiece 1, and the second cutter knife 5b cuts the other end 13 (runner portion) of the workpiece 1. The first cutter knife 5a and the second cutter knife 5b of the cutter knife 5 cut the workpiece 1 almost simultaneously, without being limited thereto, or with a slight time lag. The cutting speed (sliding speed) of the cutter knife is preferably 0.1 to 1.0 mm/sec, particularly preferably 0.2 to 0.6 mm/sec.

After the cutting of the workpiece 1 is completed, the rotation of the rotary drive means 3 is stopped. The air cylinder 7 then drives the two support means 4b and 4c located on the upper side to retract from below to above. The upper half fixing jig 2b is then detached from the lower half fixing jig 2a and removed. Subsequently, the work product (product) cut at two places are taken out. The cutting apparatus according to the present invention cuts the workpiece 1 with the cutter knife 5 while rotating the workpiece 1, so that the cut surfaces of the work product will not produce chips with small variations in size and with high planarity of the cut surfaces.

In the cutting apparatus according to the present invention, the internal structure and the holding method of the workpiece fixing jig 2 are not limited to the embodiment above. The bellows portion may be supported, or the abutment portions 21a and 21b may be members having a rib structure narrower than those shown in FIG. 5. The outer peripheral surface of the workpiece fixing jig 2 is not limited to the embodiment above, and only a portion that is meshed may be toothed and the other portion may have a cylindrical outer peripheral surface. The cutting conditions including the rotation speed of the workpiece fixing jig 2 and the cutting speed of the cutter knife are determined as appropriate. The number of places where the workpiece is cut is not limited to two and may be changed in accordance with the number of cut portions of the workpiece.

The present invention will be described specifically with Examples below. The Examples are shown only by way of example and do not limit the present invention.

EXAMPLE 1

A corrugated tube shown in FIG. 11 was cut with the cutting apparatus shown in FIGS. 1 and 2 under the cutting conditions as specified below. The cut surfaces obtained by cutting 20 times (20 samples) and whether chips were produced were observed. The corrugated tube was cut at two places shown by reference numerals a and b in FIG. 11.

<Cutting Conditions>
(Corrugated Tube)

A PTFE hollow tube was used. The length was 58 mm, the outer diameter of the large-diameter portion was 13.8 mm, the outer diameter of the intermediate-diameter portion was 9.3 mm, and the tube thickness was 0.6 mm.

(Cut Position)

Two places 47.8 mm from the center of the corrugated tube toward the ends.

(Cutting Conditions)

The rotation speed of the workpiece fixing jig 2 was 300 rpm, and the cutting speed (sliding speed) of the cutter knife was 0.4 mm/sec.

(Cutter Knife)

The height of the straight blade was 25 mm, the angle of the blade edge was 15 degrees, and the thickness of the blade was 0.3 mm.

<Evaluation Result>

No chips were produced, and the standard deviation σ of the longitudinal size between the cut portion and an outer peripheral protrusion located at a position 5 mm shifted from the cut portion in the longitudinal direction was 0.02 mm. When the cut portion was put on a surface plate and visually examined, no gap was found, indicating that variations in size were extremely small and the planarity was high.

COMPARATIVE EXAMPLE 1

The same corrugated tube as Example 1 was fixed by a known fixing apparatus, and cutting was carried out 20 times by moving a rotary blade while rotating the rotary blade. As a result, the "length σ" was 0.10 mm, and the size precision was inferior.

COMPARATIVE EXAMPLE 2

The same corrugated tube as Example 1 was primarily cut and thereafter trimmed by a special cutter to a predetermined size. As a result, burrs were produced at the inner and outer peripheries of the cut portion. The inner diameter of the product was occasionally trimmed

COMPARATIVE EXAMPLE 3

The same corrugated tube as Example 1 was burned off with a laser. As a result, white powder (low molecular weight product of PTFE) adhered to the burned-off surface. This white powder could not be removed easily.

INDUSTRIAL APPLICABILITY

According to the present invention, for apparatus manufactures, a safe apparatus with little trouble can be provided because of a simple apparatus configuration. For users, the chips removal process is not required and high-quality products are provided because chips are not produced as a result of cutting with small variations in size, and the planarity of the cut surface is high.

LIST OF REFERENCE SYMBOLS

1: workpiece (corrugated tube)
2: workpiece fixing jig
3: rotary drive means
4a-4c: support means
5a, 5b: cutter knife
6: slide moving means
10: cutting apparatus

The invention claimed is:

1. A cutting apparatus comprising:
a workpiece fixing jig that supports a longitudinal hollow resin molded product as a workpiece so as to hold an outer peripheral surface of the workpiece between two half cylindrical members from opposite sides and rotates the workpiece while fixing the workpiece;
rotary drive means for driving and rotating the workpiece fixing jig;
support means for supporting the workpiece fixing jig while rotating along with rotation of the workpiece fixing jig;
a cutter knife that cuts the rotating workpiece at least at axially opposite ends of the workpiece; and
slide moving means for slidably moving the cutter knife, wherein
connection between the rotary drive means and the workpiece fixing jig is achieved by meshing of a gear of the rotary drive means with a gear of the workpiece fixing jig.

2. The cutting apparatus according to claim 1, wherein the workpiece is made of polytetrafluoroethylene (PTFE).

3. The cutting apparatus according to claim 1, wherein the cutter knife has a cutting angle of 10 to 25 degrees and a blade thickness of 0.2 to 0.33 mm.

4. A cutting apparatus comprising:
a workpiece fixing jig that supports a longitudinal hollow resin molded product as a workpiece so as to hold an outer peripheral surface of the workpiece between two half cylindrical members from opposite sides and rotates the workpiece while fixing the workpiece;
rotary drive means for driving and rotating the workpiece fixing jig;
support means for supporting the workpiece fixing jig while rotating along with rotation of the workpiece fixing jig;
a cutter knife that cuts the rotating workpiece at least at axially opposite ends of the workpiece; and
slide moving means for slidably moving the cutter knife, wherein
connection between the support means and the workpiece fixing jig is achieved by meshing of a gear of the support means with a gear of the workpiece fixing jig.

5. The cutting apparatus according to claim 4, wherein the workpiece is made of polytetrafluoroethylene (PTFE).

6. The cutting apparatus according to claim 4, wherein the cutter knife has a cutting angle of 10 to 25 degrees and a blade thickness of 0.2 to 0.33 mm.

* * * * *